Sept. 8, 1942.  R. S. HAVENHILL ET AL  2,295,471
CONTROL DEVICE
Filed Feb. 17, 1939  2 Sheets-Sheet 1
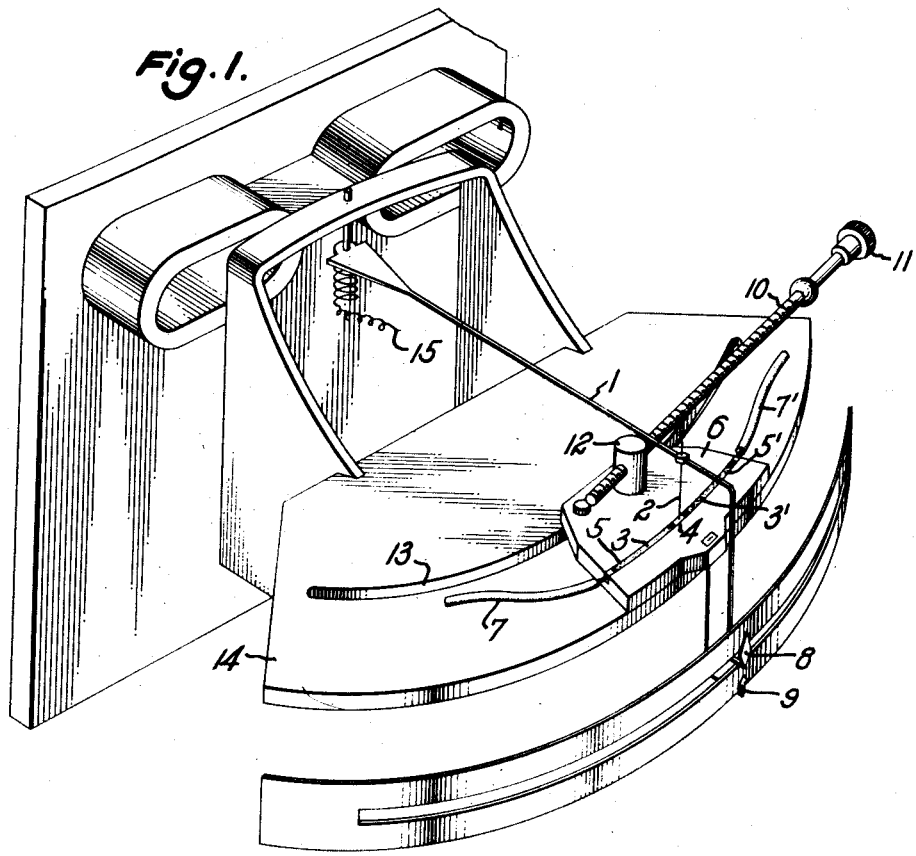
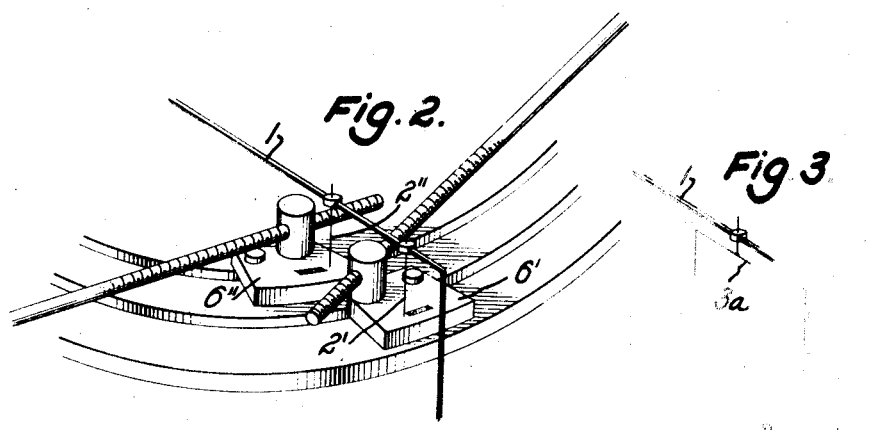
Inventor
Robert S. Havenhill
Harold C. O'Brien
By Potter, Pierce & Scheffler
Attorneys Patented Sept. 8, 1942

2,295,471

UNITED STATES PATENT OFFICE 2,295,471

CONTROL DEVICE

Robert S. Havenhill and Harold C. O'Brien, Beaver, Pa., assignors to St. Joseph Lead Company, New York, N. Y., a corporation of New York Application February 17, 1939, Serial No. 257,015

9 Claims. (Cl. 236—69)

This invention relates to control devices of the type wherein the movement and position of an element movable in response to variations in a quantity to be regulated, for example, the indicating needle of a measuring instrument, such as an ammeter, wattmeter, stack draft gauge, pressure gauge, pyrometer, speedometer, and the like, actuates or controls appropriate regulating or alarm devices.

A principal object of this invention is to provide a means of communication between the indicating member of a measuring instrument and an exterior electric circuit which it is desired to actuate by the movement or position of the indicating member, in such a manner that "hunting" or over-travel of the control circuit is avoided.

A further object of this invention is to provide the above means of communication in such a manner that neither through mechanical nor electrical action will the normal function and operation of the measuring instrument be disturbed, altered, or modified in any manner detrimental to desirable operating characteristics.

Still another object of this invention is to provide the above means of communication in such a form that it may readily be incorporated in the standard forms of measuring instruments, meters, or gauges, such as wattmeters, voltmeters, power factor meters, velocity gauges, fluid composition meters, and the like, with a minimum of expense and change.

Another object of this invention is to provide a simple means of setting the position of the control point of the instrument so that adjustments may be made quickly and accurately.

A further object of this invention is the provision of simple means for periodically breaking the perceiving circuit in order that "hunting" or over-travel may be avoided in the actuating or control circuit.

Other objects and advantages of the invention will be apparent from the description of the invention.

Various types of contact-making measuring instruments are known in the prior art. In one class of instruments the indicating member, usually a vane or needle of small moment of inertia, mechanically touches suitable contacts, obstructing further movement of the needle, to complete an electric circuit through the needle, the contact, and the exterior portion of the circuit, which usually comprises a source of power and one or more relays. The position of the contact or contacts may or may not be adjustable with reference to the various positions of the needle. These instruments have the advantage of being relatively simple in construction, but have the disadvantage that the delicate needle and needle mounting and bearing may be damaged by the shock of the abrupt collision between the moving needle and the stationary contact.

In another class of instruments the indicating member makes no mechanical contact but discloses its position to the perceiving circuit by some non-mechanical means. For example, the moving vane may interrupt a beam of light and thus cause a photoelectric cell and associated relays to operate, or, the moving vane may change the capacity of a small condenser set up in the path of travel of the vane and affiliated with a control circuit in known manner. These instruments have the advantage of complete freedom of needle movement, but have the disadvantage of requiring rather elaborate and costly construction.

In applying contact-making instruments to control work a serious difficulty is encountered, in that characteristic known as "hunting" or over-travel. For example, suppose a contact-making voltmeter is provided with two contacts, one of which is positioned at the upper limit of the desired voltage range, the other being placed at the lower limit of the desired voltage range, and let these two perceiving circuits be connected, through suitably interposed relays and power sources, to voltage regulators so connected that when the voltmeter needle touches the upper limit contact, the voltage regulator will lower the voltage in the circuit (the potential of which the voltmeter is registering), and when the voltmeter needle touches the lower limit contact the voltage regulator will raise the voltage in the circuit (the voltage of which the voltmeter is registering). Now, if the voltage falls to the lower limit, the voltage regulator will commence to increase the voltage, and this will cause the voltmeter needle to travel toward the upper contact. Although the voltage regulator ceases operating when the lower contact is broken, the inertia of the needle will, if the instrument is at all sensitive and if the upper and lower contacts are in close proximity to each other (as indeed they must be if closely held voltage control is to be obtained), carry the needle up to the upper contact, which causes the voltage to be lowered, whence the same process is repeated. This cyclic over-shooting or over-traveling is called "hunting" and is a troublesome occurrence with all finely adjustable control instruments, especially where there exists any time differential between the movement of perception (contact of the needle) and the movement of response (voltmeter needle changing because of action of voltage regulating mechanism).

In our invention we provide a simple means of avoiding undesired hunting, and we also provide a means of effecting contact, which possesses the advantages of both classes of instruments previously described but not the disadvantages.

Briefly, we establish communication between the needle and the contact or contacts by means of a very fine filament or wire, referred to as a "cat-whisker," secured to the needle. This cat-whisker dips into a pool or pools of liquid material through which an electric current may be passed. Mercury or a suitable electrolyte may serve as suitable liquids. The liquid pool does not offer an abrupt resistance to the cat-whisker, but offers instead a smooth, effective contact, the length of which may be as long or as short as necessary for the particular requirement at hand.

Several modifications are possible to suit the exigencies of particular problems. For example, several individual segregated pools may be placed along the path of the cat-whisker, or two or more cat-whiskers may be attached to the needle and dip into concentrically parallel pools. Thus, any desired number and sequence of contacts may be obtained. The pools are conveniently established in grooves or hollows cut in an insulating material of suitable structure, for example, synthetic or natural plastics, plastic rubber compositions, wood, and the like. The platform holding the pools may be made adjustable by providing a guide slot and a propelling screw. More elaborate adjustment may be secured by providing a plurality of guide slots each to carry a portion of a sub-divided platform, each portion of which bears one or more pools or globules of conducting liquid, and each division of the platform being independently adjustable by means of a screw, lever, or other suitable device. When contact is made between the cat-whisker and one of the conducting pools, a weak electric current is passed through the circuit composed of the needle, the cat-whisker, the pool of conducting liquid, the associated leads, the power source, and to the primary control mechanism, for example, a relay.

To avoid damaging the hair spring, bearings, or other parts appertaining to the indicating needle, it is prudent to limit the strength of the electric current to low values. In practice, with instruments of average ruggedness, a current of several milliamperes may be handled without damage in the way of heating or burning out the needle or its associated parts. Sensitive magnetic relays may be actuated by currents of the order of 2 milliamperes. To avoid sparking between the liquid pool and the cat-whisker, it is advisable to keep the current small. A small current will make insignificant any electrolysis or degradation of the electrolyte or other current-conducting liquid constituting the contact pool. Instruments of the type included in our invention have operated for months at 4.5 milliamperes with no evidence of oxidation or other degradation, by sparking, of the mercury pool. To avoid reactance effects we prefer to employ direct current rather than alternating current. A suitable source of current is a dry cell battery. Other sources of direct current, such as wet cells, storage batteries, dynamos, and rectifiers of various types, including vacuum-tube rectifiers, may be employed. Vacuum-tube rectifiers have the advantage of being simple and cheap, and replacement tubes can be obtained from nearly any radio supply store.

To decrease still further the amount of current drawn by the contact-making circuit, it is advantageous to employ a vacuum-tube relay, such as the usual three-element type, as the primary responsive element in the contact-making circuit, this circuit being fed into the grid circuit of the vacuum-tube in known manner. By this method the current employed in the perceiving or contact-making circuit can be made negligible (i. e., much less than one milliampere).

In our invention, hunting or over-travel of the indicating needle is avoided by periodically breaking or interrupting the perceiving or contact-making circuit. By doing this, two important objects are accomplished. First, the contact must be maintained for a certain length of time before the relay will act; second, the controlling action is broken up into steps which eliminate inertia or lag effects. It often happens that the indicating needle of the measuring instrument oscillates between small limits due to small, frequent changes in the circuit in which it is placed, or to exterior influences such as vibrations of the mounting panel, etc. These vibrations may bring about fleeting contacts between the cat-whisker and the conducting liquid pool. By introducing suitable interruptions in the perceiving circuit, the effects of these transitory contacts are rendered negligible. By introducing periodicity into the perceiving circuit, a similar periodicity is introduced into the actuating or control circuit. Thus, in the voltage control example previously cited, the corrective action of the voltage regulator occurs, not in one large sweep, but rather in small increments. This interruption prevents the indicating needle from building up a high velocity, hence the inertia effects are diminished. Most important, by introducing a lag into the perceiving circuit, we have compensated for an overshoot in the control circuit. This circuit interruption could be applied directly to the control circuit, but as this involves the breaking of larger currents and is not otherwise advantageous, the preferred place for introducing the interruptions is in the perceiving circuit.

We may introduce the interruption by various means, such as by mechanical means, by time delay relays, or by make-and-break relays so connected that closing of one relay actuates a second relay which opens the circuit leading to the first relay, the opening of which closes the circuit to the second relay which starts the cycle over again. In the preferred embodiment of our invention, however, we secure the interruptions by the conjunctive use of a single-pole, double-throw relay and a vacuum tube of two or more elements. In one position of the relay, current flows through the filament of the vacuum tube. If direct current is used, the filament is connected to the negative side of the circuit. The plate is connected to the positive side of the circuit. If the tube contains other elements than plate and filament, these other elements are connected to the plate circuit, giving the effect of a two-element tube. When the filament becomes hot, an electron current flows from the filament to the plate. The plate circuit is connected through the relay coils, so that when an electron current flows from filament to plate, the relay is actuated. This action breaks the filament circuit and closes or makes the perceiving circuit, i. e. the circuit linking the cat-whisker in the contact-making measuring instrument. When the filament circuit has been broken, the filament cools off and the plate current decreases to a small value. The relay then opens, which opens the perceiving circuit and once more closes the filament heating circuit. Periodic interruptions of the perceiving circuit are thus obtained. The period of the interruptions can be varied to some extent by adjusting the tension on the relay spring. This interruption device has the advantage of being simple and inexpensive to construct and of possessing low operating and maintenance costs. Interruptions of the order of one per second are satisfactory for many applications.

Our invention is applicable to almost any type of control work where it is feasible for an external electric circuit to effect, with or without interposed mechanical linkages, a control of a condition of which the indicating member of the measuring instrument is an index. On instruments with vertical plane arc indicators, for example, the cat-whisker may dip into one or more liquid pools or globules seated in hollow point holders. By employing self-locking type relays, this system can be given the same versatility as that possessed by the horizontal plane-indicating meter.

The invention will be more particularly described with reference to the accompanying drawings in which:

Fig. 1 is a schematic representation of the essential elements of the control device of the invention in operative relation;

Fig. 2 is a fragmentary representation of a modification of the invention;

Fig. 3 is a fragmentary representation of a further modification of the invention.

Figure 4:
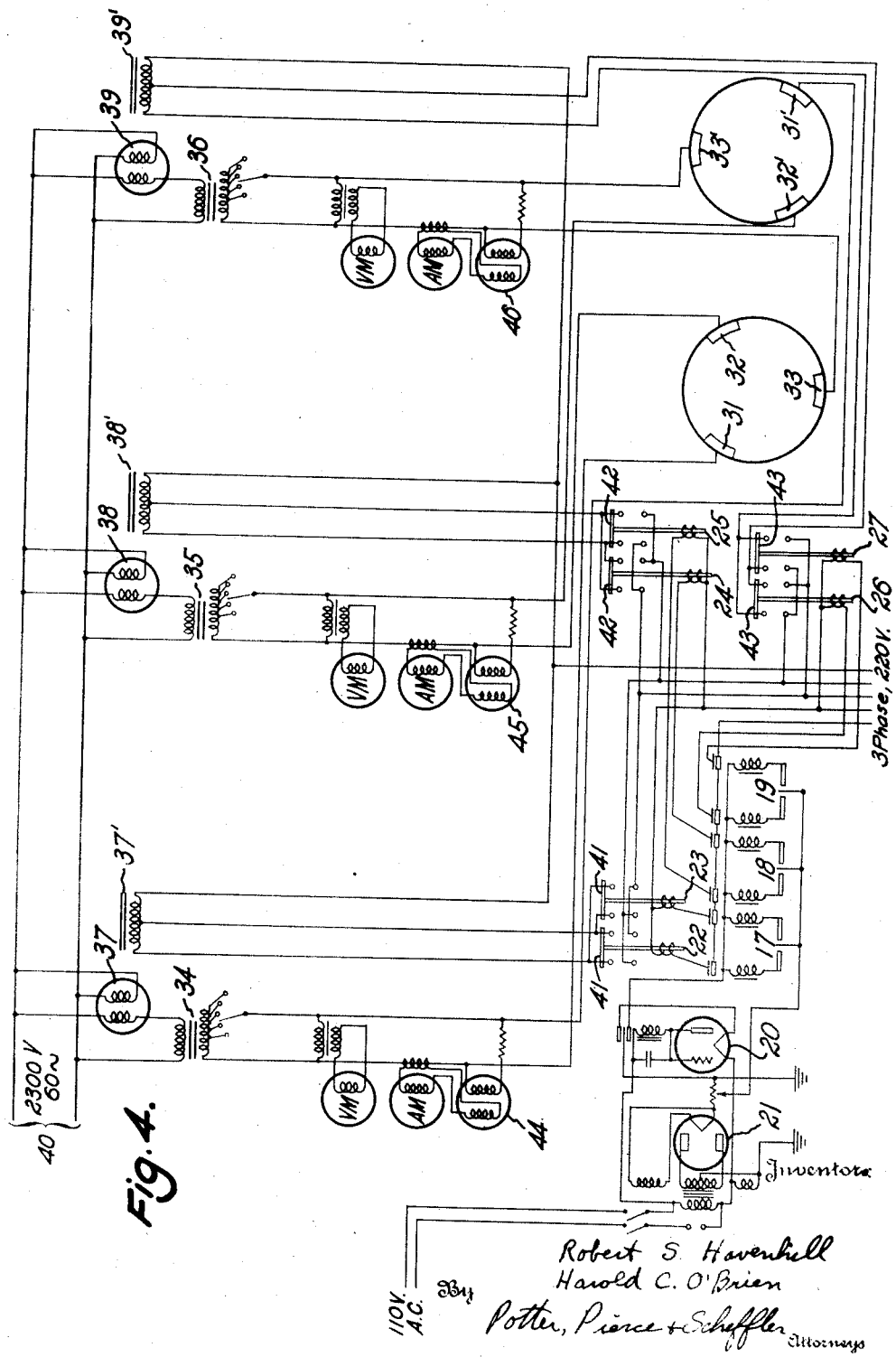
Fig. 4 is a diagrammatic representation of a system embodying the invention for controlling the voltage in a three-circuit electrothermic furnace.

The device of Fig. 1 represents an indicating instrument, such as a wattmeter, with the indicating needle 1 arranged to swing in a horizontal plane. A cat-whisker 2 is fastened to the indicating needle. The end of the cat-whisker may dip in either of the pools 3 or 3' or may rest between them in the space 4. The pools of conducting liquid, preferably mercury, are provided in grooves 5, 5' cut in the insulating block 6. The ends of the grooves may conveniently be closed by use of a suitable insulating material. The liquid pools are separated physically and insulated electrically by the interposition of a piece of suitable insulating material 4. Close to the floor of the groove a wire 7, 7', preferably of iron or some other metal not readily wet by mercury, is passed through each end of the groove to establish electrical connection with the respective mercury pools. When the indicating needle 1 swings above the insulating block 6 the cat-whisker 2 dips slightly into one or the other of the pools 3 or 3' to establish electrical contact, or else it rests between the pools at 4 and makes no electrical contact. Advantageously the amount of liquid in the pools is such that the meniscus rises slightly above the surface of block 6 so that the cat-whisker will contact the meniscus of liquid pools but will not contact the block when over 4. This system of contacts becomes, in effect, a single-pole, double-throw switch with an "off" position in the center at 4. Such a system may be employed to hold the indicating pointer 8 steadily at the "off" position 4 by utilizing the pool contacts on either side of 4 to adjust the external conditions to effect the desired control.

The location of the control point 4 is indicated by the pointer 9 located in a visible position along the path of travel of the indicating vane 8. The position of the insulating block 6, and hence of the control point 4 and indicator 9, is adjustable through the adjusting screw 10, thumb-nut 11 and threaded post assembly 12. The path of travel of the insulating block is guided by the guide-slot 13 cut in the supporting platform 14.

To secure control of the external circuit to hold the indicating needle at the control point 4, suitable means of communication between the contact pools 3 and 3' and the external circuit is provided. Suppose, for example, that the control device is a contact-making wattmeter, measuring the power being supplied to an electric furnace of the charge resistance type, and it is wished to maintain an even power input of stated amount. By means of the adjusting screw 10 the control point 4 as indicated by the pointer 9 is set at the desired position on the wattmeter scale. If the cat-whisker is in contact with pool 3, a relay is closed through lead 7 which in turn actuates a voltage regulator which increases the voltage and hence the power supplied to the furnace. The wattmeter needle 1 responds to this power increase by moving toward the right (assuming the instrument scale increases from left to right in normal fashion). As long as the contact between the cat-whisker and pool 3 is maintained, the relays are actuated at intervals determined by the interrupter previously described. The power is hence increased step-wise until the cat-whisker leaves pool 3 and comes to the control point 4. Here no electrical contact is made, so no relays are actuated, and the voltage regulator does not change. If, now, the resistance of the furnace charge changes so as to change the voltage and hence the power, indicating needle 1 will respond and cause the cat-whisker to leave the control point 4 and contact either contact pool 3 or 3' depending upon whether the change is one which would decrease or increase the power. As soon as a definite contact between the cat-whisker and a contact pool has been established, the system moves to correct itself and return the indicating needle 1 to control point 4. The effect of a randomly vibrating needle and of hunting or over-travel is minimized by the method of periodic interruptions previously described. The current circuit in the instrument is by way of connection 15 to the needle mounting, and thence through the cat-whisker 2 to pool 3 connecting with lead 7, or to pool 3' connecting with lead 7'.

The closeness of control afforded by invention may be made as sharp as desirable. In fact, the fineness of adjustment that may be made is closer than the degree of change in conditions required to affect the indicating needle of the measuring instrument. For very close control two cat-whiskers (2', 2'' of Fig. 2) may be employed, so spaced that emergence of one cat-whisker from a pool corresponds almost with the immersion of the other cat-whisker (or other branch of a forked cat-whisker 2a of Fig. 3) in the other pool. The pools may be placed in concentrically parallel paths on separately movable insulating blocks 6', 6'' of Fig. 2, so that two cat-whiskers can be used to good advantage in obtaining precise control.

As will be seen from the drawings, the liquid pools extend a substantial distance along the path of the cat-whisker, so that a flat free surface of substantial extent is provided along the path of contact which reduces instability and hunting, and eliminates the possibility of over-running the control point without actuating the control operations.

Fig. 4 depicts a complete control assembly useful in maintaining constant power input to a resistance furnace. This furnace is of the shaft type, including three symmetrically-spaced electrodes in the upper portion of the shaft, and a similar arrangement near the lower end of the shaft. The three electrode pairs 31, 31', 32, 32', 33, 33' are each supplied with an independently-controlled single-phase circuit. These circuits originate in transformers 34, 35, 36 and voltage regulators 37, 38, 39 supplied by a 2300-volt, 60-cycle line 40. Power input may be adjusted manually by means of push-buttons 41, 42, 43 which control the voltage regulator motors 37', 38', 39' or the power may be regulated automatically by means of wattmeter control devices 44, 45, 46 of the invention. The contact-making elements of these wattmeters are indicated at 17, 18, 19. The interrupter is shown at 20 and the source of rectified current of low milliamperage at 21. A deflection of the needle of one of the wattmeters causes the cat-whisker to contact the appropriate mercury pool, whereby interrupted current flows through the associated contacting relays 22, 23, 24, 25, 26, 27 performing the same function as the equivalent push-buttons 41, 42, 43. The subsequent movement of the voltage regulator restores the wattmeter needle to the indicated control point. In this manner any changes in the resistance of the furnace charge are compensated by automatic adjustment of the voltage to that value required to maintain a constant power input.

The provision, by our invention, of such automatic assurance of constancy of power input, as described in the above example, offers numerous advantages from the practical viewpoint of economical furnace operation. With a vertical shaft furnace of this type, downward through which is constantly passing a granular charge, frequent changes of electrical resistance of considerable magnitude occur. Since the amount of heat developed in the furnace is directly a function of the power input, appropriate adjustments must be made of the voltage impressed across the electrodes. In actual practice which we have observed, such adjustments have been made on the average of once every 10 minutes. If the adjustments are not made, as when in an emergency the operator may be called away from his instrument board, the rate of power input (heat input) may be so altered as to change markedly the temperature of the furnace charge. With coke as the principal current-conducting ingredient of the charge, a change in temperature brings about a still further change in the electrical resistance of the charge, with the result that the furnace gets out of hand, with ensuing loss of product and loss of time required to re-establish correct operating conditions.

The installation of the automatic power control device described herein compensates for electrical resistance erraticness. The operator can leave his furnace unattended for several hours without damage. By providing an even flow of power, overheating and underheating are avoided.

Although we have described particular forms which our invention may assume and have described an illustrative example of its application in practice, it will be understood that many variations in structure and arrangement are possible within the scope of the invention.

We claim:

1. In a control device, the combination with an instrument including a moving system and a pointer carried by said moving system, of a conductive element mounted on said pointer, a body of conductive liquid presenting a free surface extending along a substantial portion of and in the path of motion of said element whereby movement of said pointer from a predetermined position in a path parallel to the free surface of said body brings said element into contact with said body, electric circuit elements connecting said element and said body of conductive liquid with means for periodically energizing the circuit formed when said element is in contact with said body of conductive liquid.

2. A control device comprising an element movable in response to variations in the quantity to be regulated, contact means including a body of conductive liquid presenting a free surface extending along a substantial portion of and in the path of motion of said element on each side of the position of said element corresponding to a predetermined desired condition of the quantity to be regulated whereby movement of said element from said position in a path parallel to the free surface of said body brings said element into contact with said body, and electric circuit elements connecting said element and said bodies of conductive liquid with means for adjusting the quantity to be regulated and with means for energizing said circuit elements intermittently, whereby operation of said adjusting means is initiated in a predetermined sense when said element is in contact with one of said bodies of conducting liquid.

3. An electric furnace control system comprising an element movable in response to variations in the energy supplied to the furnace, a body of conductive liquid presenting a free surface extending along a substantial portion of and in the path of motion of said element on each side of the position of said element corresponding to a predetermined value of energy whereby movement of said element from said position in a path parallel to the free surface of said body brings said element into contact with said body, and electric circuit elements connecting said element and said bodies of conductive liquid with means for energizing said circuit elements intermittently and with means for adjusting the energy supply, whereby the energy supply is increased when said element is in contact with one of said bodies and decreased when said element is in contact with the other of said bodies.

4. An electric furnace control system comprising a measuring instrument having a movable member responsive to variations in the energy supplied to the furnace, a conductive element mounted on said movable member, bodies of conductive liquid presenting a free surface extending along a substantial portion of and in the path of motion of said conductive element on each side of a predetermined position thereof whereby movement of said member from said predetermined position in a path parallel to the free surface of said bodies brings said element into contact with one of said bodies, and electric circuit elements connecting said element and each of said bodies of conductive liquid with means for energizing said circuit elements intermittently and with means for adjusting the energy supply, whereby the energy supply is increased when said element is in contact with one of said bodies and decreased when said element is in contact with the other of said bodies.

5. An electric furnace control system comprising an element movable in response to variations in the energy supplied to the furnace, a body of mercury presenting a free surface extending along a substantial portion of and in the path of motion of said element on each side of the position of said element corresponding to a predetermined value of energy whereby movement of said element from said position in a path parallel to the free surface of said body brings said element into contact with said body, and electric circuit elements connecting said element and said bodies of mercury with means for energizing said circuit elements intermittently and with means for adjusting the energy supply, whereby the energy supply is increased when said element is in contact with one of said bodies and decreased when said element is in contact with the other of said bodies.

6. An electric furnace control system comprising a measuring instrument having a movable member responsive to variations in the energy supplied to the furnace, a conductive element mounted on said movable member, bodies of mercury presenting a free surface extending along a substantial portion of and in the path of motion of said conductive element on each side of a predetermined position thereof whereby movement of said member from said predetermined position in a path parallel to the free surface of said bodies brings said element into contact with one of said bodies, and electric circuit elements connecting said element and each of said bodies of mercury with means for energizing said circuit elements intermittently and with means for adjusting the energy supply, whereby the energy supply is increased when said element is in contact with one of said bodies and decreased when said element is in contact with the other of said bodies.

7. In a control device, the combination with an instrument including a moving system and a pointer carried by said moving system, of at least two conductive elements mounted on said pointer, separate bodies of conductive liquid presenting free surfaces extending along substantial non-corresponding portions of and in the path of motion of said elements whereby movement of said pointer from a predetermined position in a path parallel to the free surface of said bodies brings one of said elements into contact with the meniscus portion only of one of said bodies, electric circuit elements connecting said elements and said bodies of conductive liquid with means for periodically energizing the circuit formed when one of said conductive elements is in contact with one of said bodies of conductive liquid, and means for varying the position of the bodies of conductive elements along the paths of motion of said bodies.

8. In a control device, the combination with an instrument including a moving system and a pointer carried by said moving system, of at least two conductive elements mounted on said pointer, separate bodies of conductive liquid presenting free surfaces extending along substantial non-corresponding portions of and in the path of motion of said elements whereby movement of said pointer from a predetermined position in a path parallel to the free surface of said bodies brings one of said elements into contact with the meniscus portion only of one of said bodies, electric circuit elements connecting said elements and said bodies of conductive liquid with means for periodically energizing the circuit formed when one of said conductive elements is in contact with one of said bodies of conductive liquid, and means for independently varying the position of the bodies of conductive elements along the paths of motion of said elements.

9. In a control device, the combination with an instrument including a moving system and a pointer carried by said moving system, of at least two conductive elements mounted on said pointer, separate bodies of conductive liquid presenting free surfaces extending along substantial non-corresponding portions of and in the path of motion of said elements whereby movement of said pointer from a predetermined position in a path parallel to the free surface of said bodies brings one of said elements into contact with the meniscus portion only of one of said bodies, and electric circuit elements connecting said conductive elements and said bodies of conductive liquid with means for periodically energizing the circuit formed when one of said conductive elements is in contact with one of said bodies of conductive liquid.

ROBERT S. HAVENHILL.
HAROLD C. O'BRIEN.